(12) United States Patent
Zhang et al.

(10) Patent No.: US 11,726,364 B2
(45) Date of Patent: Aug. 15, 2023

(54) DIFFUSION PLATE SUPPORT FRAMES, DIRECT-TYPE BACKLIGHT MODULES AND DISPLAY APPARATUSES

(71) Applicants: K-Tronics (Suzhou) Technology Co., Ltd., Jiangsu (CN); BOE Technology Group Co., Ltd., Beijing (CN)

(72) Inventors: Yanan Zhang, Beijing (CN); Zhibin Hao, Beijing (CN); Zhihua Zhang, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 39 days.

(21) Appl. No.: 17/509,861

(22) Filed: Oct. 25, 2021

(65) Prior Publication Data
US 2022/0146883 A1   May 12, 2022

(30) Foreign Application Priority Data
Nov. 11, 2020 (CN) .......................... 202022600722.4

(51) Int. Cl.
G02F 1/13357 (2006.01)
(52) U.S. Cl.
CPC .. *G02F 1/133608* (2013.01); *G02F 1/133606* (2013.01)
(58) Field of Classification Search
CPC .................... G02F 1/133608; G02F 1/133606
See application file for complete search history.

(56) References Cited

U.S. PATENT DOCUMENTS

| | | | | |
|---|---|---|---|---|
| 2005/0281050 A1* | 12/2005 | Chou | ................ | G02F 1/133608 362/612 |
| 2007/0279936 A1* | 12/2007 | Song | ................ | G02F 1/133605 362/613 |
| 2009/0154139 A1* | 6/2009 | Shin | .................. | G02F 1/133608 362/382 |
| 2010/0061084 A1* | 3/2010 | Lee | .................. | G02F 1/133608 362/97.1 |
| 2012/0105739 A1* | 5/2012 | Shimizu | ............ | G02F 1/133603 348/790 |
| 2013/0128444 A1* | 5/2013 | Kuo | .................. | G02F 1/133608 361/679.21 |
| 2017/0123273 A1* | 5/2017 | Kim | .................. | G02F 1/133603 |
| 2019/0025653 A1* | 1/2019 | Park | ................. | G02F 1/133608 |
| 2022/0146883 A1* | 5/2022 | Zhang | .............. | G02F 1/133608 |

FOREIGN PATENT DOCUMENTS

| | | | | |
|---|---|---|---|---|
| CN | 106200126 A | * | 12/2016 | ....... G02F 1/133603 |
| CN | 104296079 B | | 12/2017 | |
| JP | 2007157450 A | * | 6/2007 | |

* cited by examiner

*Primary Examiner* — Ashok Patel
(74) *Attorney, Agent, or Firm* — IPro, PLLC

(57) ABSTRACT

The present disclosure relates to a diffusion plate support frame, a direct-type backlight module and a display apparatus. The diffusion plate support frame includes: a bottom plate; and one or more support portions, each of the one or more support portions is located on the bottom plate and comprises: a first buffer structure, and a support pin. The first buffer structure is located between the bottom plate and the support pin, and the first buffer structure is used for buffering pressure when subjected to a pressure applied by the support pin towards the bottom plate.

20 Claims, 6 Drawing Sheets

DIFFUSION PLATE SUPPORT FRAMES, DIRECT-TYPE BACKLIGHT MODULES AND DISPLAY APPARATUSES

CROSS REFERENCE TO RELATED APPLICATIONS

This application claims priority to Chinese Patent Application No. 202022600722.4 entitled "DIFFUSION PLATE SUPPORT FRAMES, DIRECT-TYPE BACKLIGHT MODULES AND DISPLAY APPARATUSES" filed on Nov. 11, 2020, the entire content of which is incorporated herein by reference.

TECHNICAL FIELD

The present disclosure relates to the field of display technology, and in particular to, diffusion plate support frames, direct-type backlight modules and display apparatuses.

BACKGROUND

A liquid crystal display apparatus generally needs to use a backlight module to provide a light source. According to different distribution positions of the backlight module in the liquid crystal display apparatus, the backlight module can be divided into two types: side-type backlight module and direct-type backlight module. The side-type backlight module is placed on a side of the liquid crystal display, and the direct-type backlight module is placed below the liquid crystal display. In general, the direct-type backlight module includes components such as light source, plastic frame, optical film and diffusion plate. The diffusion plate is arranged above the light source, but the diffusion plate may bend and deform under the action of gravity, so a diffusion plate support frame is needed to support the diffusion plate.

SUMMARY

According to a first aspect of embodiments of the present disclosure, there is provided a diffusion plate support frame, including: a bottom plate; and one or more support portions, each of the one or more support portions is located on the bottom plate and includes: a first buffer structure, and a support pin; wherein the first buffer structure is located between the bottom plate and the support pin, and the first buffer structure is used for buffering pressure when subjected to a pressure applied by the support pin towards the bottom plate.

In an embodiment, the first buffer structure and the bottom plate enclose a buffer space.

In an embodiment, the first buffer structure includes a first support plate, a second support plate and a third support plate, the first support plate, the second support plate and the third support plate are sequentially connected, and the first support plate and the third support plate are located between the second support plate and the bottom plate; the first support plate, the second support plate, the third support plate and the bottom plate enclose the buffer space; and the support pin is located on the second support plate.

In an embodiment, the support pin includes a second buffer structure, and the second buffer structure is located at an end of the support pin away from the bottom plate, and the second buffer structure is used for buffering pressure when subjected to a pressure towards the bottom plate.

In an embodiment, the second buffer structure is arc-shaped.

In an embodiment, a radian of the second buffer structure is greater than or equal to 135°.

In an embodiment, the support pin further includes a pillar and one or more auxiliary support plates, the pillar is fixedly connected with each of the one or more auxiliary support plates, a height of the pillar is greater than a height of each of the auxiliary support plates, and a width of each of the auxiliary support plates gradually decreases from the bottom plate to a direction away from the bottom plate, and the second buffer structure is located at an end of the pillar away from the bottom plate.

In an embodiment, the support pin is a cone, and a diameter of the support pin gradually decreases from the bottom plate to a direction away from the bottom plate.

In an embodiment, the support pin includes at least two auxiliary support plates, and the at least two auxiliary support plates are distributed radially around the pillar.

In an embodiment, the diffusion plate support frame further includes a boss, a clamping portion and a positioning column, the boss is located at a side of the bottom plate away from the support pin, and the clamping portion and the positioning column are located at a side of the boss away from the bottom plate; the clamping portion includes a slot, and a height of the positioning column is greater than or equal to a depth of the slot; and the positioning column is a cylinder, and a diameter of the positioning column is 2 mm to 3 mm.

In an embodiment, a number of the support portions on the bottom plate is N, and N is a positive integer greater than or equal to 2.

In an embodiment, a thickness of the bottom plate is 1 mm to 2 mm; a shape of the bottom plate is circular or rectangular; a height of the first buffer structure is 2 mm to 4 mm; a size of the first buffer structure is smaller than a size of the bottom plate; if the shape of the bottom plate is rectangular and a projection of the first buffer structure on the bottom plate is rectangular, a length of the first buffer structure is less than a length of the bottom plate, and a width of the first buffer structure is less than a width of the bottom plate; a material of the bottom plate and a material of the first buffer structure are same as a material of the support pin; the material of the bottom plate, the material of the first buffer structure and the material of the support pin are colorless transparent materials or milky white plastics; the bottom plate, the first buffer structure and the support pin are integrally injection molded by a mold.

According to a second aspect of embodiments of the present disclosure, there is provided a direct-type backlight module, including: a back plate, a backlight source, a diffusion plate, and a diffusion plate support frame, including: a bottom plate; and one or more support portions, each of the one or more support portions is located on the bottom plate and includes: a first buffer structure, and a support pin; wherein the first buffer structure is located between the bottom plate and the support pin, and the first buffer structure is used for buffering pressure when subjected to a pressure applied by the support pin towards the bottom plate; and the backlight source and the diffusion plate support frame are located on the back plate, the diffusion plate is located above the diffusion plate support frame, and there is a gap between the diffusion plate and the diffusion plate support frame.

In an embodiment, when the diffusion plate support frame includes a boss, a clamping portion, and a positioning column, the direct-type backlight module further includes a reflector plate, the back plate includes a first opening and a second opening, and the reflector plate includes a third opening; projections of the first opening and the second opening on the bottom plate are located in a projection of the third opening on the bottom plate; the reflector plate is located between the bottom plate and the back plate, the clamping portion sequentially passes through the third opening and the first opening, and the clamping portion and the boss clamp the back plate in cooperation, a size of the first opening matches a size of the clamping portion, the positioning column sequentially passes through the third opening and the second opening, and a size of the second opening matches a size of the positioning column; the reflector plate is adjacent to the boss, and a thickness of the reflector plate is same as a thickness of the boss.

In an embodiment, a shape of the first opening is rectangular, a length of the first opening is 5 mm to 10 mm, and a width of the first opening is 3 mm to 5 mm; a shape of the second opening is circular; a diameter of the second opening is 2.1 mm to 3.2 mm; a shape of the third opening is rectangular, a length of the third opening is 22.2 mm to 24.2 mm, and a width of the third opening is 2.1 mm to 3.2 mm.

In an embodiment, when the clamping portion includes a slot, a depth of the slot is equal to a thickness of the back plate.

In an embodiment, the direct-type backlight module includes a plurality of diffusion plate support frames and a plurality of backlight sources arranged in an array; each of the plurality of diffusion plate support frames is located between two adjacent rows of backlight sources arranged along a first direction; the plurality of diffusion plate support frames are uniformly distributed in the first direction, two adjacent diffusion plate support frames in a second direction are arranged in a staggered arrangement, and the first direction intersects the second direction; or, the plurality of diffusion plate support frames are uniformly distributed in the first direction and the second direction, respectively, and the first direction intersects the second direction.

In an embodiment, the first direction is perpendicular to the second direction; a distance between two adjacent backlight sources is 40 mm to 60 mm; a distance between two adjacent diffusion plate support frames in the first direction is 150 mm to 200 mm; a distance between two adjacent diffusion plate support frames in the second direction is 100 mm to 150 mm; when a number of the support portions on a same bottom plate is N, a distance between two adjacent support portions is equal to the distance between two adjacent backlight sources.

In an embodiment, a distance between the diffusion plate and the support portion is greater than or equal to 1 mm and less than or equal to 2 mm.

According to a third aspect of embodiments of the present disclosure, there is provided a display apparatus including the above-mentioned direct-type backlight modules.

It should be understood that the above general description and the following detailed description are only exemplary and explanatory, and do not limit the present disclosure.

BRIEF DESCRIPTION OF DRAWINGS

The drawings herein are incorporated in and constitute a part of the specification, illustrate embodiments consistent with the present disclosure, and together with the description serve to explain the principles of the disclosure.

DETAILED DESCRIPTION

Figure 1:
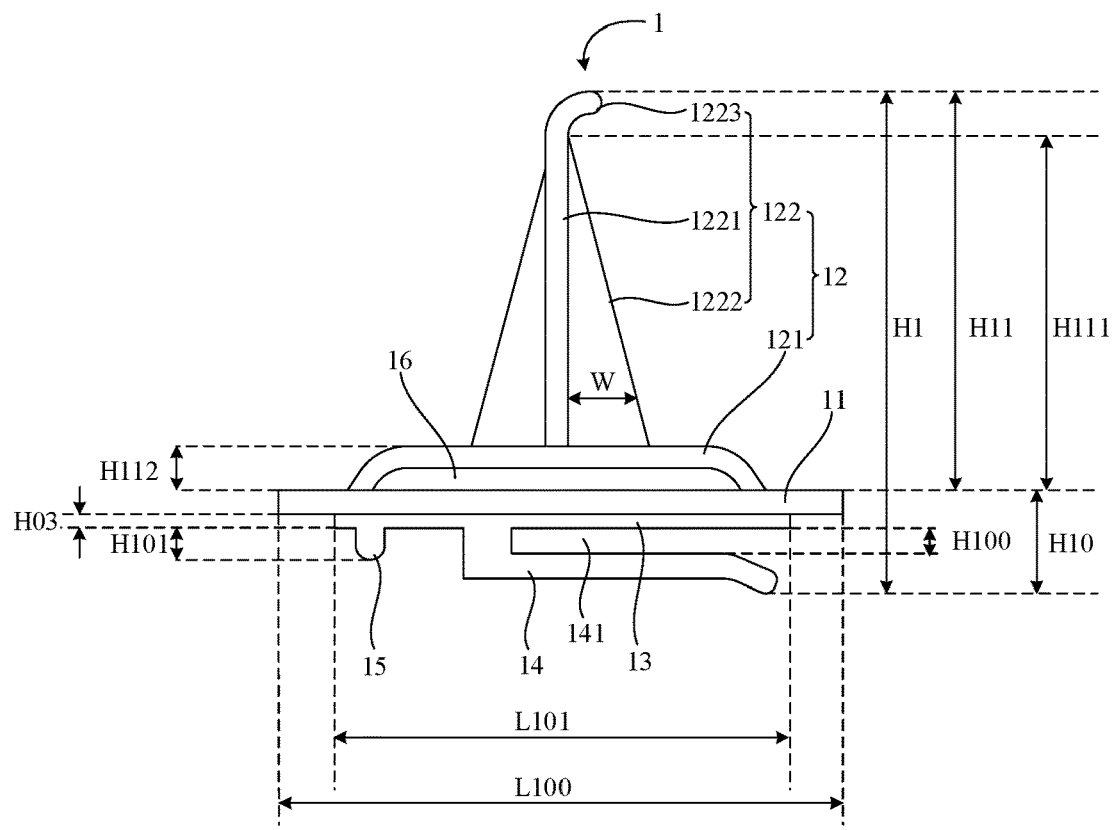
FIG. 1 is a schematic structural diagram of a diffusion plate support frame according to an embodiment of the present disclosure.

Examples will be described in detail herein, with the illustrations thereof represented in the drawings. When the following descriptions involve the drawings, same numbers in different drawings refer to same or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

An embodiment of the present disclosure provides a diffusion plate support frame/diffusion plate support structure. A diffusion plate support frame 1 shown in FIG. 1 includes a bottom plate 11 and a support portion 12, and the support portion 12 is located on the bottom plate 11. The support portion 12 includes a first buffer structure 121 and a support pin 122. The first buffer structure 121 is located between the bottom plate 11 and the support pin 122, and the first buffer structure 121 is used for buffering pressure when subjected to a pressure applied by the support pin 122 towards the bottom plate 11.

In this embodiment, since there is a first buffer structure between the bottom plate and the support portion, the first buffer structure plays a buffer role when subjected to a pressure applied by the support pin towards the bottom plate. Therefore, when the support portion is compressed by the diffusion plate, the first buffer structure can play a buffer role, which can prevent the diffusion plate support frame from scratching the diffusion plate when the diffusion plate collapses downward.

The diffusion plate support frame 1 provided by the embodiment of the present disclosure is briefly introduced above, and the diffusion plate support frame 1 provided by the embodiment of the present disclosure will be described in detail below.

An embodiment of the present disclosure further provides a diffusion plate support frame/diffusion plate support structure 1. The diffusion plate support frame 1, as shown in FIG. 1, includes the bottom plate 11, the support portion 12, a boss 13, a clamping portion 14 and a positioning column 15.

As shown in FIG. 1, the support portion 12 is located on the bottom plate 11. The support portion 12 includes the first buffer structure 121 and the support pin 122. The first buffer structure 121 is located between the bottom plate 11 and the support pin 122, and the first buffer structure 121 is used for buffering pressure when subjected to a pressure applied by the support pin 122 towards the bottom plate 11.

As shown in FIG. 1, the first buffer structure 121 and the bottom plate 11 enclose a buffer space 16. When the support portion 12 is compressed by the diffusion plate, the first buffer structure 121 can deform to the buffer space 16 to play a buffer role, which can prevent the diffusion plate support frame from scratching the diffusion plate when the diffusion plate collapses downward.

In this embodiment, the first buffer structure 121 may include a first support plate 1211, a second support plate 1212, and a third support plate 1213. The first support plate 1211, the second support plate 1212, and the third support plate 1213 are sequentially connected. The first support plate 1211 and the third support plate 1213 are located between the second support plate 1212 and the bottom plate 11. The first support plate 1211, the second support plate 1212, the third support plate 1213 and the bottom plate 11 enclose the buffer space 16, and the support pin 122 is located on the second support plate 1212.

As shown in FIG. 1, in this embodiment, a shape of the bottom plate 11 may be rectangular. In another embodiment, the shape of the bottom plate 11 may be circular. In other embodiments, the bottom plate 11 may be other shapes. A thickness of the bottom plate 11 may be 1 mm to 2 mm. In another embodiment, the thickness of the bottom plate 11 is 1.5 mm to 2 mm. For example, the thickness of the bottom plate 11 may be 1 mm, 1.5 mm, 1.7 mm, or 2 mm.

In this embodiment, a height $H112$ of the first buffer structure 121 may be 2 mm to 4 mm. For example, the height $H112$ of the first buffer structure 121 may be 2 mm, 2.8 mm, or 4 mm.

In this embodiment, a size of the first buffer structure 121 is smaller than a size of the bottom plate 11. When the shape of the bottom plate 11 is rectangular and a projection of the first buffer structure 121 on the bottom plate 11 is rectangular, a length of the first buffer structure 121 is smaller than a length of the bottom plate 11, and a width of the first buffer structure 121 is smaller than a width of the bottom plate 11.

Figure 2:
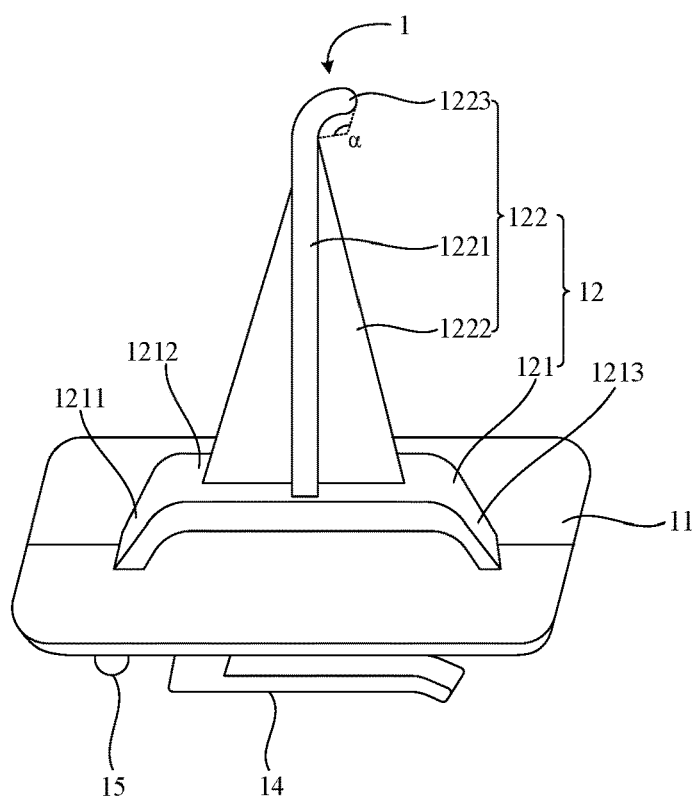
FIG. 2 is a schematic structural diagram of another diffusion plate support frame according to an embodiment of the present disclosure.

As shown in FIGS. 1 and 2, in this embodiment, the support pin 122 may include a pillar 1221, an auxiliary support plate 1222, and a second buffer structure 1223.

As shown in FIG. 1, in this embodiment, the pillar 1221 is fixedly connected with the auxiliary support plate 1222, a height $H11$ of the pillar 1221 is greater than a height $H111$ of the auxiliary support plate 1222, and a width W of the auxiliary support plate 1222 gradually decreases from the bottom plate 11 to a direction away from the bottom plate 11. For example, a shape of the auxiliary support plate 1222 may be triangular or trapezoidal.

In this embodiment, the support pin 122 may include at least two auxiliary support plates 1222, and the at least two auxiliary support plates 1222 are distributed radially around the pillar 1221. For example, the support pin 122 may include four auxiliary support plates 1222, and the four auxiliary support plates 1222 are distributed in a cross shape. Of course, the number of auxiliary support plates 1222 may alternatively be one, two, three, or other numbers.

In this embodiment, when the number of auxiliary support plates 1222 is greater than two, the heights of all auxiliary support plates 1222 may be same or different.

As shown in FIG. 1, in this embodiment, the second buffer structure 1223 is located at an end of the pillar 1221 away from the bottom plate 11. The second buffer structure 1223 is used for buffering pressure when subjected to a pressure towards the bottom plate 11.

As shown in FIGS. 1-2, in this embodiment, the second buffer structure 1223 may be arc-shaped. A radian $\alpha$ of the second buffer structure 1223 may be greater than or equal to 135°. For example, the radian $\alpha$ of the second buffer structure 1223 may be 135°, 140°, 150° or other degrees.

As shown in FIG. 1, in this embodiment, the support pin 122 includes the second buffer structure 1223, and the second buffer structure 1223 is located at an end of the support pin 122 away from the bottom plate 11. When the support portion 12 is compressed by the diffusion plate, the second buffer structure 1223 can deform towards the bottom plate 11 to play a buffer role, which can prevent the diffusion plate support frame from scratching the diffusion plate when the diffusion plate collapses downward.

As shown in FIG. 1, in this embodiment, the boss 13 is located at a side of the bottom plate 11 away from the support pin 122, and the clamping portion 14 and the positioning column 15 are located at a side of the boss 13 away from the bottom plate 11.

As shown in FIG. 1, in this embodiment, the clamping portion 14 may include a slot 141. A height $H101$ of the positioning column 15 may be greater than a depth $H100$ of the slot 141. In another embodiment, the height $H101$ of the positioning column 15 may be equal to the depth $H100$ of the slot 141. The height $H101$ of the positioning column 15 is equal to a distance between a surface of the boss 13 away from the bottom plate 11 and an end of the positioning column 15 away from the bottom plate 11. In an embodiment, the positioning column 15 is a cylinder, and a diameter of the positioning column 15 is 2 mm to 3 mm.

In this embodiment, a material of the bottom plate 11, a material of the first buffer structure 121, and a material of the support pin 122 may be same, for example, they may all be colorless transparent materials, or they may all be milky white plastics. In another embodiment, the material of the bottom plate 11, the material of the first buffer structure 121, and the material of the support pin 122 may be different.

In this embodiment, the bottom plate 11, the first buffer structure 121 and the support pin 122 may be integrally injection molded by a mold.

Figure 3:
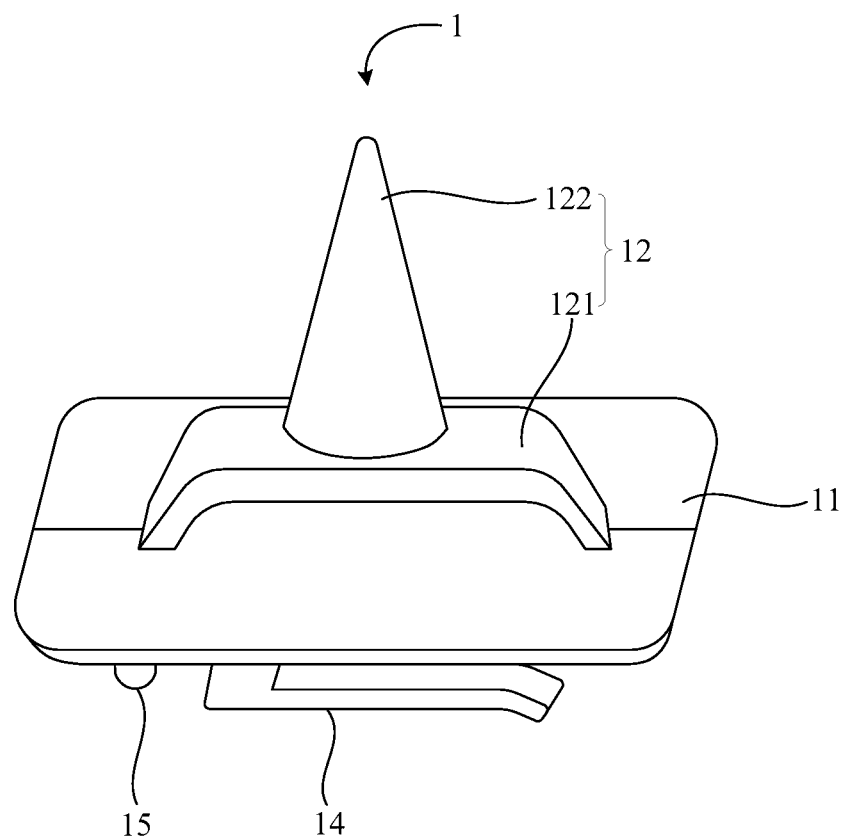
FIG. 3 is a schematic structural diagram of another diffusion plate support frame according to an embodiment of the present disclosure.

An embodiment of the present disclosure further provides a diffusion plate support frame 1. The difference from the above-mentioned embodiments is that in this embodiment, as shown in FIG. 3, the support pin 122 is a cone, and a diameter of the support pin 122 gradually decreases from the bottom plate 11 to a direction away from the bottom plate 11. The structures of other parts can be referred to the above-mentioned embodiments in case of no conflict, and thus will not be repeated here.

Optionally, a second buffer structure 1223 is disposed on the top of the cone support pin 122, the second buffer structure 1223 may be arc-shaped, and a radian α of the second buffer structure 1223 may be greater than or equal to 135°.

An embodiment of the present disclosure further provides a diffusion plate support frame/diffusion plate support structure 1. The difference from the above-mentioned embodiments is that, in this embodiment, the number of support portions 12 on a same bottom plate 11 is N, and N is a positive integer greater than or equal to 2.

Figure 4:
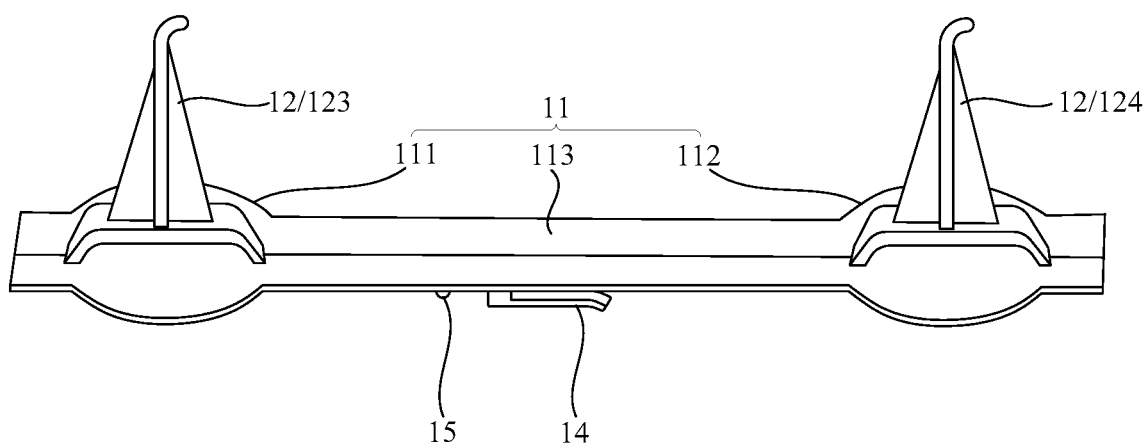
FIG. 4 is a schematic structural diagram of another diffusion plate support frame according to an embodiment of the present disclosure.
Figure 5:
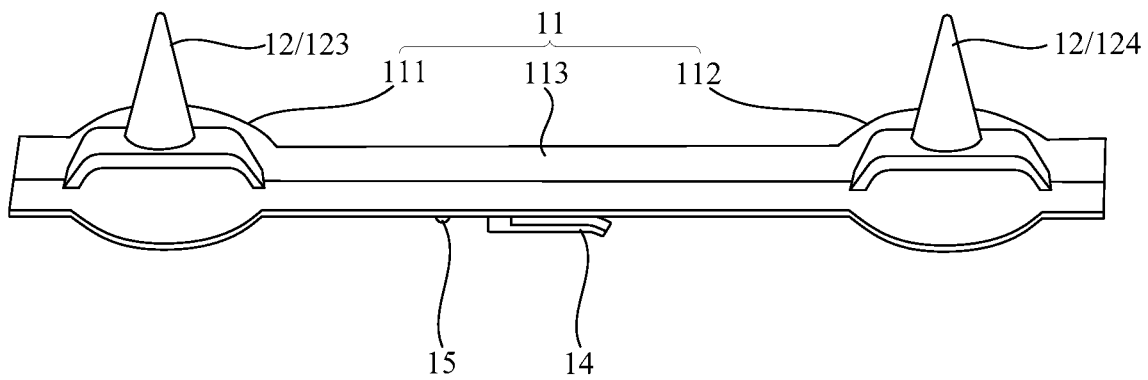
FIG. 5 is a schematic structural diagram of another diffusion plate support frame according to an embodiment of the present disclosure.

For example, as shown in FIGS. 4 and 5, the number of support portions 12 on a same bottom plate 11 may be two, and the two support portions 12 include a first support portion 123 and a second support portion 124. In an embodiment, the bottom plate 11 includes a first bottom plate portion 111, a second bottom plate portion 112, and a connecting portion 113. The connecting portion 113 is located between the first bottom plate portion 111 and the second bottom plate portion 112 for connecting the first bottom plate portion 111 and the second bottom plate portion 112. The first bottom plate portion 111 is circular, the second bottom plate portion 112 is circular, and the connecting portion 113 is rectangular. In other embodiments, the first bottom plate portion 111, the second bottom plate portion 112, and the connecting portion 113 may be other shapes. The first support portion 123 is located on the first bottom plate portion 111, and the second support portion 124 is located on the second bottom plate portion 112.

Figure 6:
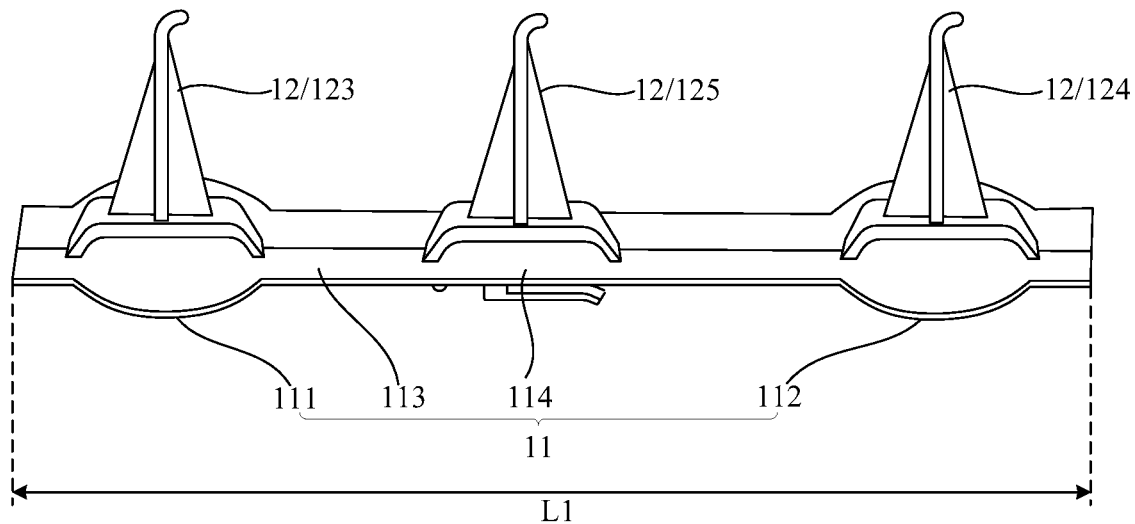
FIG. 6 is a schematic structural diagram of another diffusion plate support frame according to an embodiment of the present disclosure.
Figure 7:
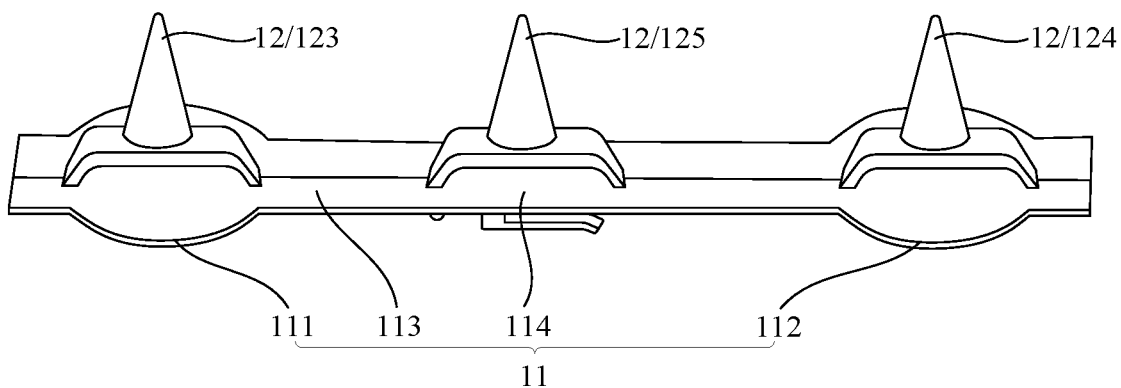
FIG. 7 is a schematic structural diagram of another diffusion plate support frame according to an embodiment of the present disclosure.

For example, as shown in FIGS. 6 and 7, the number of support portions 12 on a same bottom plate 11 can be three, and the three support portions 12 include a first support portion 123, a second support portion 124, and a third support portion 125. In an embodiment, the bottom plate 11 includes a first bottom plate portion 111, a second bottom plate portion 112, a third bottom plate portion 114, and two connecting portions 113. One of the two connecting portions 113 is located between the first bottom plate portion 111 and the third bottom plate portion 114, and the other connecting portion 113 is located between the second bottom plate portion 112 and the third bottom plate portion 114. The first bottom plate portion 111 is circular, the second bottom plate portion 112 is circular, and the third bottom plate portion 114 is rectangular. In other embodiments, the first bottom plate portion 111, the second bottom plate portion 112, and the third bottom plate portion 114 may be other shapes. The first support portion 123 is located on the first bottom plate portion 111, the second support portion 124 is located on the second bottom plate portion 112, and the third support portion 125 is located on the third bottom plate portion 114.

Figure 8:
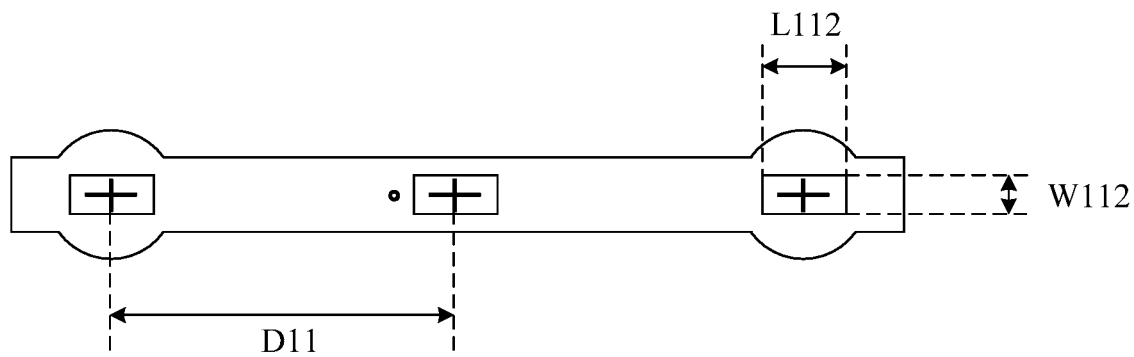
FIG. 8 is a schematic structural diagram of another diffusion plate support frame according to an embodiment of the present disclosure.

For example, when the number of support portions 12 on a same bottom plate 11 is three, a length L1 of the bottom plate 11 is 96 mm. As shown in FIG. 8, for example, a distance D11 between two adjacent support portions 12 is 45 mm. As shown in FIG. 1, for example, the height H112 of the first buffer structure 121 is 2.8 mm, the depth H100 of the slot 141 is 1.0 mm, the height H101 of the positioning column 15 is 2.4 mm, a length L101 of the boss 13 is 26 mm, and a thickness H03 of the boss 13 is 1.0 mm. A distance H10 between a surface of the bottom plate 11 close to the support portion 12 and an end of the clamping portion 14 away from the bottom plate 11 is 4.4 mm, and a distance H11 (the height of the pillar 1221) between a surface of the bottom plate 11 close to the support portion 12 and an end of the support portion 12 away from the bottom plate 11. The height H101 of the positioning column 15 is equal to a distance between a surface of the boss 13 away from the bottom plate 11 and an end of the positioning column 15 away from the bottom plate 11.

As shown in FIG. 8, when the shape of the bottom plate 11 is rectangular and the projection of the first buffer structure 121 on the bottom plate 11 is rectangular, a length L112 of the first buffer structure 121 is smaller than the length of the bottom plate 11, and a width W112 of the first buffer structure 121 is smaller than the width of the bottom plate 11. When the shape of the bottom plate 11 is circular and the projection of the first buffer structure 121 on the bottom plate 11 is rectangular, the length L112 of the first buffer structure 121 is smaller than a diameter of the bottom plate 11, and the width W112 of the first buffer structure 121 is smaller than the diameter of the bottom plate 11.

Figure 9:
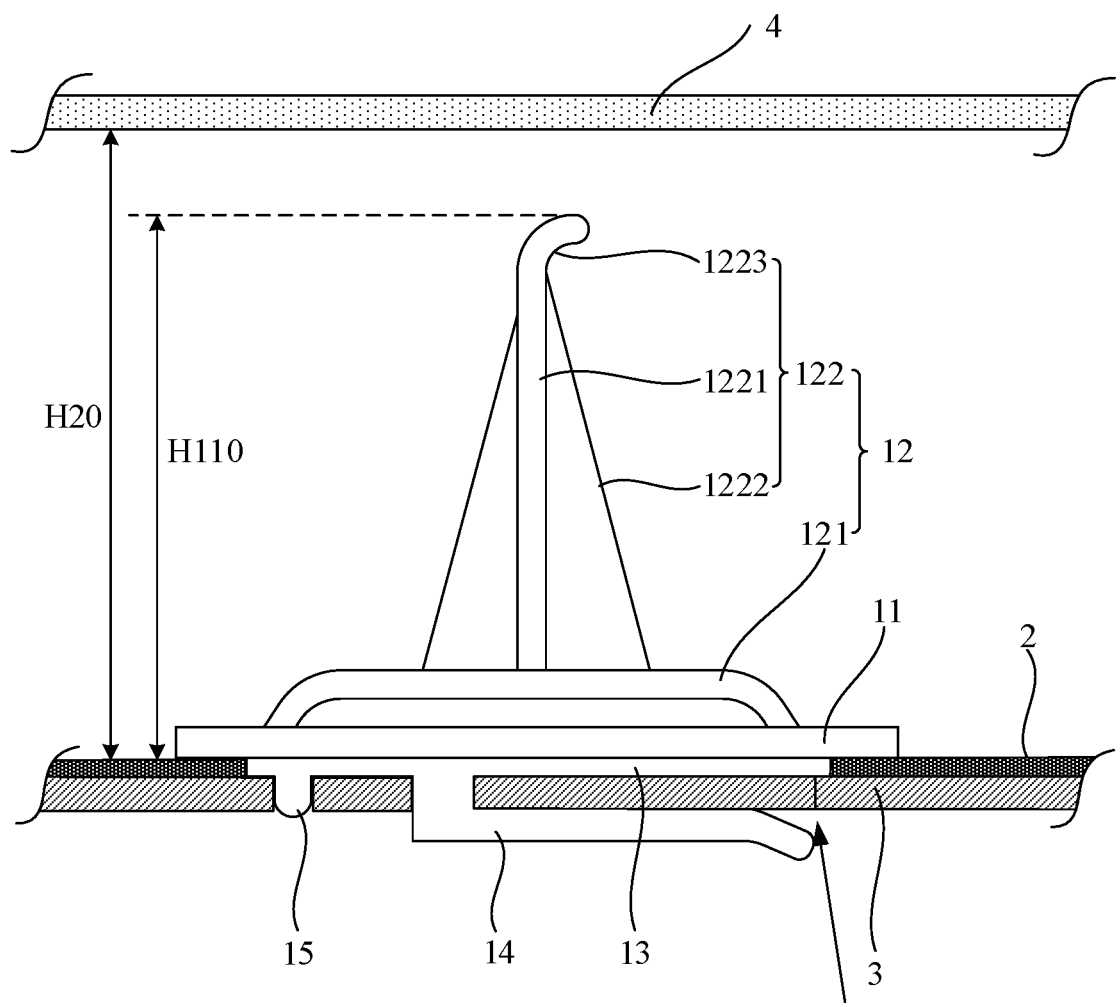
FIG. 9 is a schematic structural diagram of a direct-type backlight module according to an embodiment of the present disclosure.

An embodiment of the present disclosure further provides a direct-type backlight module. As shown in FIG. 9, the direct-type backlight module may include a reflector plate 2, a back plate 3, a plurality of backlight sources 5 (see FIGS. 11-13), a diffusion plate 4, and the diffusion plate support structure/frame 1 of any of the above embodiments.

In this embodiment, the plurality of backlight sources 5 and the diffusion plate support frame 1 are located on the back plate 3, the diffusion plate 4 is located above the diffusion plate support frame 1, and there is a gap between the diffusion plate 4 and the diffusion plate support frame 1.

In this embodiment, a distance between the diffusion plate 4 and the support portion 12 is greater than or equal to 1 mm and less than or equal to 2 mm.

In this embodiment, a distance between the diffusion plate 4 and the reflector plate 2 is H20, and a distance between an end of the support portion 12 close to the diffusion plate 4 and the reflector plate 2 is H110, D=H20−H110, 1 mm≤D≤2 mm.

In this embodiment, the plurality of backlight sources 5 may be LED lamp beads.

Figure 10:
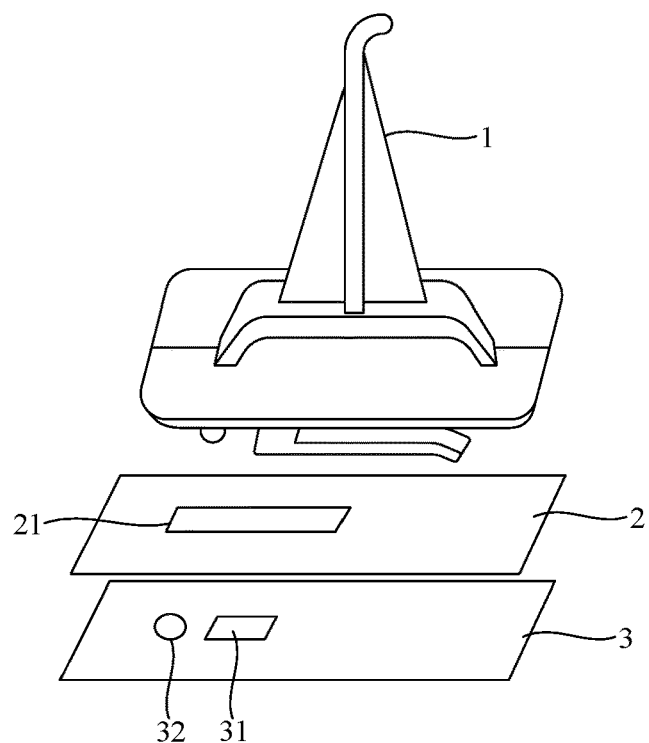
FIG. 10 is a schematic structural diagram of another direct-type backlight module according to an embodiment of the present disclosure.

In this embodiment, as shown in FIG. 10, the back plate 3 may include a first opening 31 and a second opening 32, and the reflector plate 2 may include a third opening 21. Projections of the first opening 31 and the second opening 32 on the bottom plate 11 are located in a projection of the third opening 21 on the bottom plate 11.

In this embodiment, as shown in FIG. 9, the reflector plate 2 is located between the bottom plate 11 and the back plate 3, the clamping portion 14 sequentially passes through the third opening 21 and the first opening 31, and the clamping portion 14 and the boss 13 clamp the back plate 3 in cooperation. A size of the first opening 31 matches a size of the clamping portion 14. The positioning column 15 sequentially passes through the third opening 21 and the second opening 32, and a size of the second opening 32 matches a size of the positioning column 15. The reflector plate 2 is adjacent to the boss 13 and located on a same layer as the boss 13, and a thickness of the reflector plate 2 is same as the thickness H03 of the boss 13.

In this embodiment, the size of the first opening 31 is 0.1 mm to 0.2 mm larger than the size of the clamping portion 14, and the size of the second opening 32 is 0.1 mm to 0.2 mm larger than the size of the positioning column 15, such that the clamping portion 14 can pass through the first opening 31 and the positioning column 15 can pass through the second opening 32.

In this embodiment, a length of the clamping portion 14 may be 20 mm, a width of the clamping portion 14 may be 2 mm, and a height of the clamping portion 14 may be 2 mm, but is not limited thereto.

In this embodiment, a shape of the first opening 31 may be rectangular, and a length of the first opening 31 may be 5 mm to 10 mm. For example, the length of the first opening 31 is 5 mm, 7 mm, or 10 mm. A width of the first opening 31 is 3 mm to 5 mm. For example, the width of the first opening 31 is 3 mm, 4 mm, or 5 mm.

In this embodiment, a shape of the second opening 32 may be circular, and a diameter of the second opening 32 may be 0.1 mm to 0.2 mm larger than the diameter of the positioning column 15. The diameter of the second opening 32 may be 2.1 mm to 3.2 mm. For example, when the diameter of the positioning column 15 is 2 mm, the diameter of the second opening 32 is 2.1 mm or 2.2 mm. In other embodiments, the shape of the second opening 32 may also be rectangular or other shapes.

In this embodiment, a shape of the third opening 21 may be rectangular, and a length of the third opening 21 may be 22.2 mm to 24.2 mm. A width of the third opening 21 may be 2.1 mm to 3.2 mm. For example, the length of the third opening 21 is 24.2 mm, and the width of the third opening 21 is 2.2 mm. Of course, the length and width of the third opening 21 can also be other values.

In this embodiment, the depth H100 of the slot 141 may be equal to the thickness of the back plate 3. In other embodiments, the clamping portion 14 may be made of an elastic material. In this case, the depth H100 of the slot 141 may be smaller than the thickness of the back plate 3, such that the clamping portion 14 can better cooperate with the boss 13 to clamp the back plate 3.

In this embodiment, since the diffusion plate support frame 1 can be fixed on the back plate 3 through the clamping portion 14 and the positioning column 15, no locking screws or double-sided tape are needed, which can reduce the cost. Moreover, no complex hook and claw structure is used, and the structure is simple, which is beneficial to improve the yield. Further, by sliding the clamping portion 14 into the first opening 31, the diffusion plate support frame 1 can be fixed, and the diffusion plate support frame 1 can be drawn out by slightly pulling up the positioning column 15, which is convenient for disassembly and assembly, and the diffusion plate support frame 1 can be reused to improve the utilization rate of the diffusion plate support frame 1.

Figure 11:
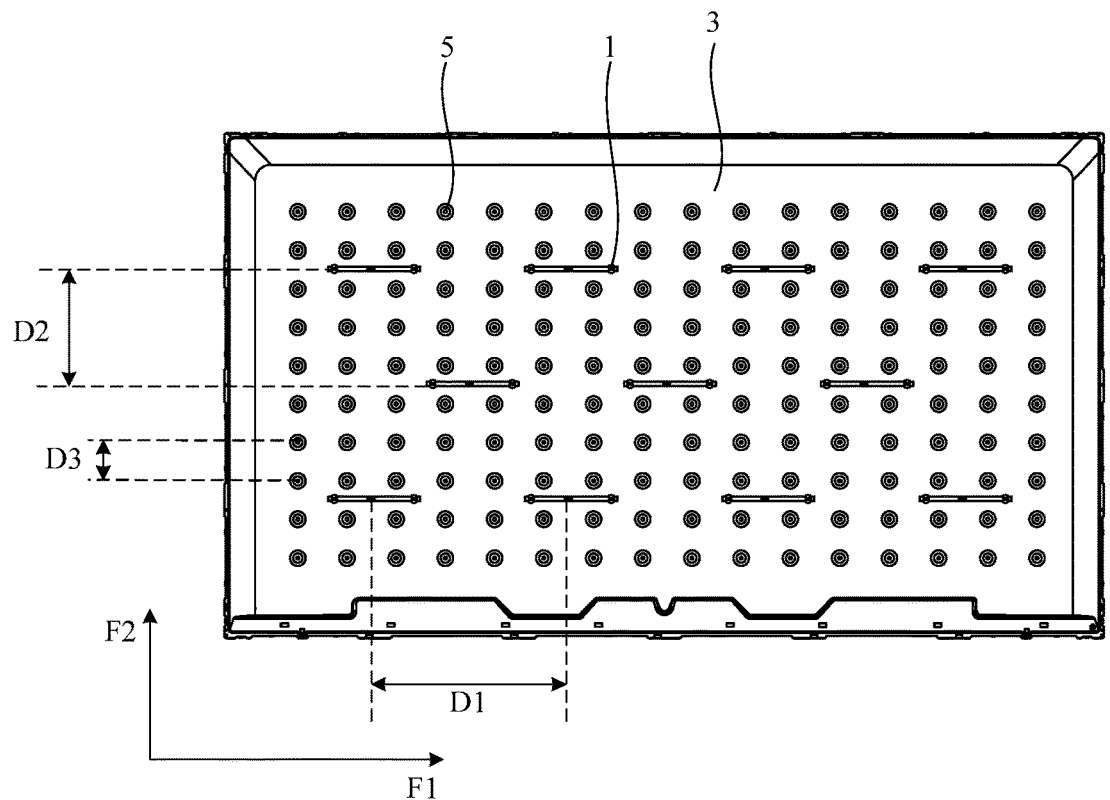
FIG. 11 is a schematic structural diagram of another direct-type backlight module according to an embodiment of the present disclosure.

In this embodiment, as shown in FIG. 11, the direct-type backlight module includes a plurality of diffusion plate support frames 1 and a plurality of backlight sources 5 arranged in an array.

In this embodiment, as shown in FIG. 11, each of the plurality of diffusion plate support frames 1 is located between two adjacent rows of backlight sources 5 arranged along a first direction F1.

In this embodiment, as shown in FIG. 11, the plurality of diffusion plate support frames 1 are uniformly distributed in the first direction F1, and two adjacent diffusion plate support frames 1 in a second direction F2 are arranged in a staggered arrangement. The first direction F1 intersects the second direction F2. In an embodiment, the first direction F1 is perpendicular to the second direction F2.

In this embodiment, a distance D3 between two adjacent backlight sources 5 is 40 mm to 60 mm. For example, the distance D3 between two adjacent backlight sources 5 is 40 mm, 50 mm, or 60 mm.

In this embodiment, as shown in FIG. 11, a distance D1 between two adjacent diffusion plate support frames 1 in the first direction F1 is 150 mm to 200 mm. For example, the distance D1 between two adjacent diffusion plate support frames 1 in the first direction F1 is 150 mm, 180 mm, or 200 mm.

In this embodiment, as shown in FIG. 11, a distance D2 between two adjacent diffusion plate support frames 1 in the second direction F2 is 100 mm to 150 mm. For example, the distance D2 between two adjacent diffusion plate support frames 1 in the second direction F2 is 100 mm, 130 mm, or 150 mm.

In this embodiment, as shown in FIG. 11, the number of support portions 12 on a same bottom plate 11 is three, and the distance D11 between two adjacent support portions 12 is equal to the distance D3 between two adjacent backlight sources 5. In other embodiments, the distance D11 between two adjacent support portions 12 may be larger or smaller than the distance D3 between two adjacent backlight sources 5.

In this embodiment, as shown in FIG. 11, in the second direction F2, the first row of diffusion plate support frames includes four diffusion plate support frames 1, the second row of diffusion plate support frames includes three diffusion plate support frames 1, and the third row of diffusion plate support frames includes four diffusion plate support frames 1.

Figure 12:
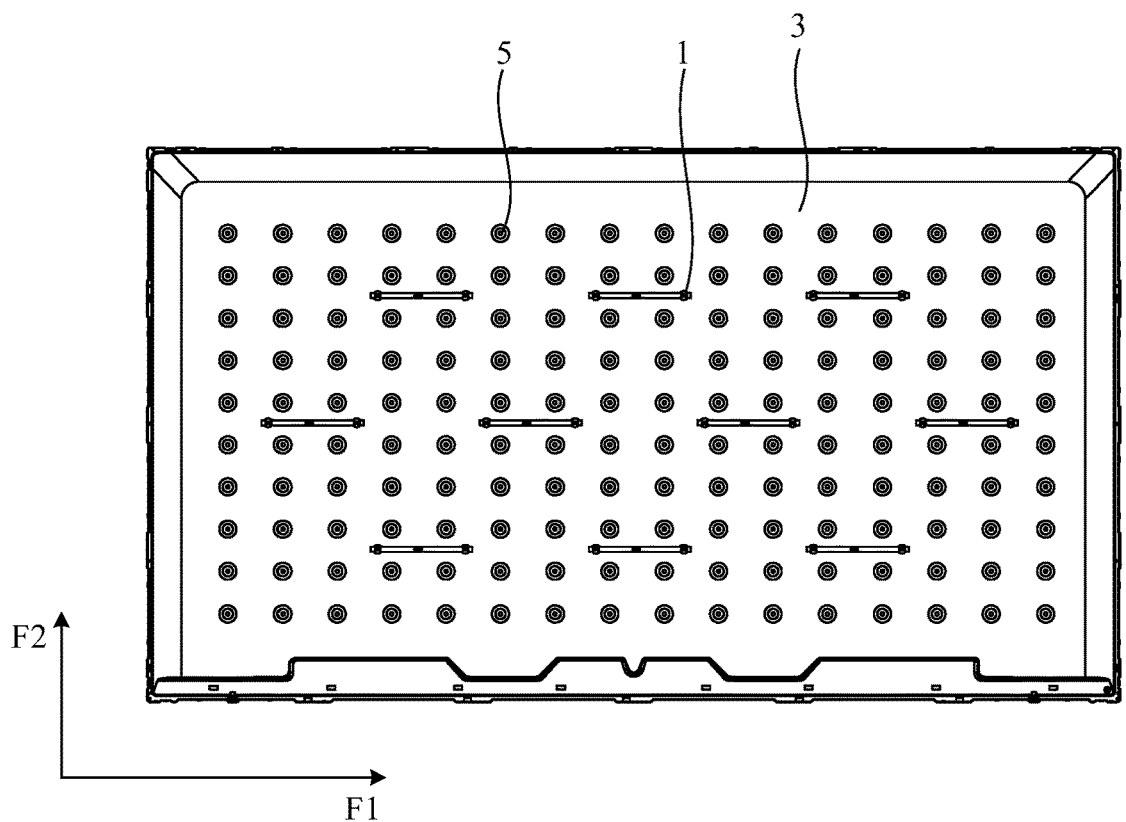
FIG. 12 is a schematic structural diagram of another direct-type backlight module according to an embodiment of the present disclosure.

In this embodiment, as shown in FIG. 12, in the second direction F2, the first row of diffusion plate support frames includes three diffusion plate support frames 1, the second row of diffusion plate support frames includes four diffusion plate support frames 1, and the third row of diffusion plate support frames includes three diffusion plate support frames 1.

Figure 13:
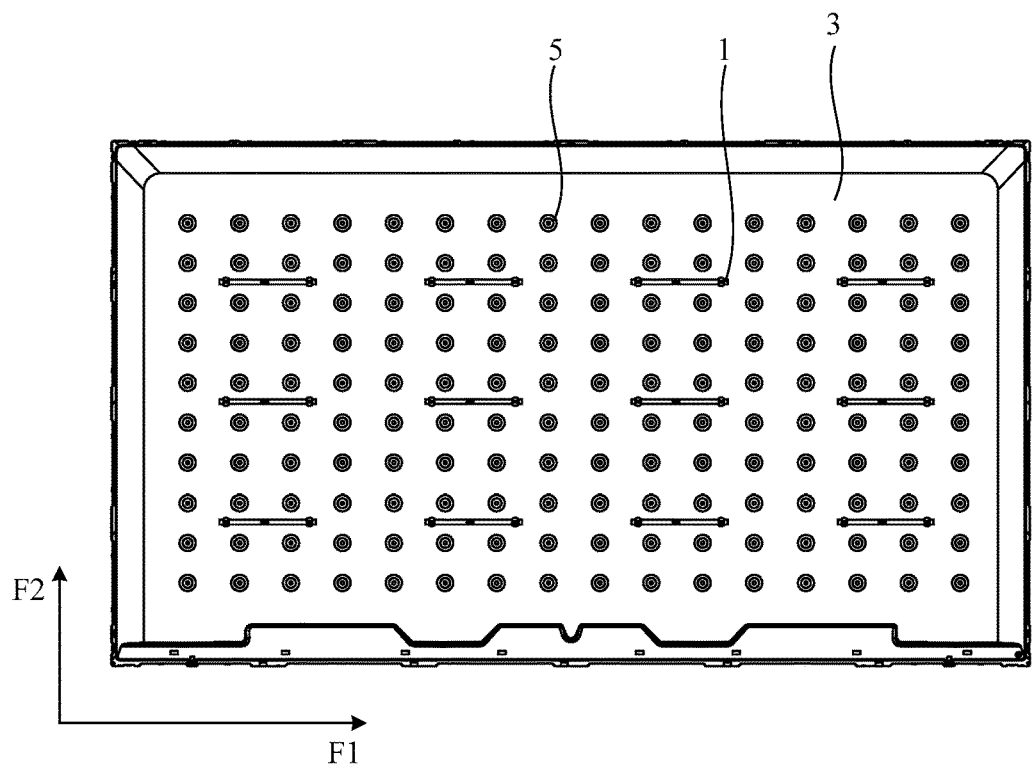
FIG. 13 is a schematic structural diagram of another direct-type backlight module according to an embodiment of the present disclosure.

In this embodiment, as shown in FIG. 13, the plurality of diffusion plate support frames 1 may be uniformly distributed in the first direction F1 and the second direction F2, respectively. In the second direction F2, the first row of diffusion plate support frames includes four diffusion plate support frames 1, the second row of diffusion plate support frames includes four diffusion plate support frames 1, and the third row of diffusion plate support frames includes four diffusion plate support frame 1.

An embodiment of the present disclosure further provides a display apparatus, including a display module, and further including the direct-type backlight module of any of the above-mentioned embodiments.

In this embodiment, since there is a first buffer structure between the bottom plate and the support portion, the first buffer structure plays a buffer role when subjected to a pressure applied by the support pin towards the bottom plate. Therefore, when the support portion is compressed by the diffusion plate, the first buffer structure can play a buffer role, which can prevent the diffusion plate support frame from scratching the diffusion plate when the diffusion plate collapses downward.

It should be noted that the display apparatus in this embodiment can be any product or component with display function, such as electronic paper, mobile phone, tablet computer, television, notebook computer, digital photo frame, navigator, etc.

It should be noted that, in the drawings, the sizes of layers and regions may be exaggerated for clarity of illustration. It is understood that when an element or layer is referred to as being "on" another element or layer, it may be directly on other elements, or intervening layers may be present. In addition, it is understood that when an element or layer is referred to as being "under" another element or layer, it may be directly under other elements, or there may be more than one intermediate layer or element. In addition, it is also understood that when a layer or element is referred to as being "between" two layers or two elements, it may be the only layer between the two layers or the two elements, or there may also be more than one intermediate layer or element. Throughout similar reference numerals indicate similar elements.

In this disclosure, the terms "first" and "second" are used for descriptive purposes only, and cannot be understood as indicating or implying relative importance. The term "plurality" refers to two or more, unless specifically defined otherwise.

Other implementations of the present disclosure will be apparent to those skilled in the art from consideration of the specification and practice of the present disclosure herein. The present disclosure is intended to cover any variations, uses or adaptive modification that follow the general principles of the present disclosure and include common knowledge or conventional technical means in the related art that are not disclosed in the present disclosure. The specification and embodiments are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A diffusion plate support frame, comprising:
a bottom plate; and
one or more support portions, each of the one or more support portions is located on the bottom plate and comprises:
a first buffer structure, and
a support pin comprising a second buffer structure, wherein the second buffer structure is arc-shaped and is located at an end of the support pin away from the bottom plate, the second buffer structure is used for buffering pressure when subjected to a pressure towards the bottom plate, and a radian of the second buffer structure is greater than or equal to 135°;
wherein the first buffer structure is located between the bottom plate and the support pin, and the first buffer structure is used for buffering pressure when subjected to a pressure applied by the support pin towards the bottom plate.

2. The diffusion plate support frame according to claim 1, wherein the first buffer structure and the bottom plate enclose a buffer space.

3. The diffusion plate support frame according to claim 2, wherein the first buffer structure comprises a first support plate, a second support plate and a third support plate,
the first support plate, the second support plate and the third support plate are sequentially connected, and the first support plate and the third support plate are located between the second support plate and the bottom plate,
the first support plate, the second support plate, the third support plate and the bottom plate enclose the buffer space; and
the support pin is located on the second support plate.

4. The diffusion plate support frame according to claim 1, wherein the support pin further comprises a pillar and one or more auxiliary support plates,
the pillar is fixedly connected with each of the one or more auxiliary support plates, a height of the pillar is greater than a height of each of the auxiliary support plates, and a width of each of the auxiliary support plates gradually decreases from the bottom plate to a direction away from the bottom plate, and
the second buffer structure is located at an end of the pillar away from the bottom plate.

5. The diffusion plate support frame according to claim 4, wherein the support pin comprises at least two auxiliary support plates, and the at least two auxiliary support plates are distributed radially around the pillar.

6. The diffusion plate support frame according to claim 1, wherein the support pin is a cone, and a diameter of the support pin gradually decreases from the bottom plate to a direction away from the bottom plate.

7. The diffusion plate support frame according to claim 1, further comprising a boss, a clamping portion and a positioning column,
the boss is located at a side of the bottom plate away from the support pin, and the clamping portion and the positioning column are located at a side of the boss away from the bottom plate;
the clamping portion comprises a slot, and a height of the positioning column is greater than or equal to a depth of the slot; and
the positioning column is a cylinder, and a diameter of the positioning column is 2 mm to 3 mm.

8. The diffusion plate support frame according to claim 1, wherein a number of the support portions on the bottom plate is N, and N is a positive integer greater than or equal to 2.

9. The diffusion plate support frame according to claim 1, wherein a thickness of the bottom plate is 1 mm to 2 mm;
a shape of the bottom plate is circular or rectangular;
a height of the first buffer structure is 2 mm to 4 mm;
a size of the first buffer structure is smaller than a size of the bottom plate;
if the shape of the bottom plate is rectangular and a projection of the first buffer structure on the bottom plate is rectangular, a length of the first buffer structure is less than a length of the bottom plate, and a width of the first buffer structure is less than a width of the bottom plate;
a material of the bottom plate and a material of the first buffer structure are same as a material of the support pin;
the material of the bottom plate, the material of the first buffer structure and the material of the support pin are colorless transparent materials or milky white plastics;
the bottom plate, the first buffer structure and the support pin are integrally injection molded by a mold.

10. A diffusion plate support frame, comprising:
a bottom plate; and
one or more support portions, each of the one or more support portions is located on the bottom plate and comprises:
a first buffer structure, and
a support pin comprising:
one or more auxiliary support plates,
a pillar, wherein the pillar is fixedly connected with each of the one or more auxiliary support plates, a height of the pillar is greater than a height of each of the auxiliary support plates, and a width of each of the auxiliary support plates gradually decreases from the bottom plate to a direction away from the bottom plate, and
a second buffer structure, wherein the second buffer structure is located at an end of the pillar away from the bottom plate, and the second buffer structure is used for buffering pressure when subjected to a pressure towards the bottom plate;

wherein the first buffer structure is located between the bottom plate and the support pin, and the first buffer structure is used for buffering pressure when subjected to a pressure applied by the support pin towards the bottom plate.

11. The diffusion plate support frame according to claim 10, wherein the first buffer structure and the bottom plate enclose a buffer space.

12. The diffusion plate support frame according to claim 10, wherein the support pin comprises at least two auxiliary support plates, and the at least two auxiliary support plates are distributed radially around the pillar.

13. A direct-type backlight module, comprising:
a back plate,
a backlight source,
a diffusion plate, and
a diffusion plate support frame, comprising:
    a bottom plate; and
    one or more support portions, each of the one or more support portions is located on the bottom plate and comprises:
        a first buffer structure, and
        a support pin comprising a second buffer structure, wherein the second buffer structure is arc-shaped and is located at an end of the support pin away from the bottom plate, the second buffer structure is used for buffering pressure when subjected to a pressure towards the bottom plate, and a radian of the second buffer structure is greater than or equal to 135°;
        wherein the first buffer structure is located between the bottom plate and the support pin, and the first buffer structure is used for buffering pressure when subjected to a pressure applied by the support pin towards the bottom plate; and
the backlight source and the diffusion plate support frame are located on the back plate, the diffusion plate is located above the diffusion plate support frame, and there is a gap between the diffusion plate and the diffusion plate support frame.

14. The direct-type backlight module according to claim 13, wherein,
when the diffusion plate support frame comprises a boss, a clamping portion, and a positioning column, the direct-type backlight module further comprises a reflector plate, the back plate comprises a first opening and a second opening, and the reflector plate comprises a third opening; projections of the first opening and the second opening on the bottom plate are located in a projection of the third opening on the bottom plate;
the reflector plate is located between the bottom plate and the back plate, the clamping portion sequentially passes through the third opening and the first opening, and the clamping portion and the boss clamp the back plate in cooperation, a size of the first opening matches a size of the clamping portion, the positioning column sequentially passes through the third opening and the second opening, and a size of the second opening matches a size of the positioning column; the reflector plate is adjacent to the boss, and a thickness of the reflector plate is same as a thickness of the boss.

15. The direct-type backlight module according to claim 14, wherein,
a shape of the first opening is rectangular, a length of the first opening is 5 mm to 10 mm, and a width of the first opening is 3 mm to 5 mm;
a shape of the second opening is circular; a diameter of the second opening is 2.1 mm to 3.2 mm;
a shape of the third opening is rectangular, a length of the third opening is 22.2 mm to 24.2 mm, and a width of the third opening is 2.1 mm to 3.2 mm.

16. The direct-type backlight module according to claim 14, wherein when the clamping portion comprises a slot, a depth of the slot is equal to a thickness of the back plate.

17. The direct-type backlight module according to claim 14, comprising a plurality of diffusion plate support frames and a plurality of backlight sources arranged in an array;
each of the plurality of diffusion plate support frames is located between two adjacent rows of backlight sources arranged along a first direction;
the plurality of diffusion plate support frames are uniformly distributed in the first direction, two adjacent diffusion plate support frames in a second direction are arranged in a staggered arrangement, and the first direction intersects the second direction; or,
the plurality of diffusion plate support frames are uniformly distributed in the first direction and the second direction, respectively, and the first direction intersects the second direction.

18. The direct-type backlight module according to claim 17, wherein,
the first direction is perpendicular to the second direction;
a distance between two adjacent backlight sources is 40 mm to 60 mm;
a distance between two adjacent diffusion plate support frames in the first direction is 150 mm to 200 mm; a distance between two adjacent diffusion plate support frames in the second direction is 100 mm to 150 mm;
when a number of the support portions on a same bottom plate is N, a distance between two adjacent support portions is equal to the distance between two adjacent backlight sources.

19. The direct-type backlight module according to claim 14, wherein a distance between the diffusion plate and the support portion is greater than or equal to 1 mm and less than or equal to 2 mm.

20. A display apparatus, comprising the direct-type backlight module according to claim 13.

* * * * *